(12) United States Patent
Bhattad et al.

(10) Patent No.: US 8,432,939 B2
(45) Date of Patent: Apr. 30, 2013

(54) USING GUARD CARRIERS FOR EXTRA CHANNELS

(75) Inventors: Kapil Bhattad, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 893 days.

(21) Appl. No.: 12/233,970

(22) Filed: Sep. 19, 2008

(65) Prior Publication Data

US 2009/0285139 A1    Nov. 19, 2009

Related U.S. Application Data

(60) Provisional application No. 61/053,604, filed on May 15, 2008.

(51) Int. Cl.
*H04J 4/00* (2006.01)

(52) U.S. Cl.
USPC .......................................................... 370/478

(58) Field of Classification Search .................. 370/310, 370/478
See application file for complete search history.

(56) References Cited

U.S. PATENT DOCUMENTS

| | | | |
|---|---|---|---|
| 6,510,133 B1 * | 1/2003 | Uesugi | 370/208 |
| 2005/0237922 A1 * | 10/2005 | Shoemake et al. | 370/208 |
| 2007/0047508 A1 * | 3/2007 | Yamada et al. | 370/338 |
| 2007/0297323 A1 * | 12/2007 | Seki | 370/208 |

FOREIGN PATENT DOCUMENTS

| | | |
|---|---|---|
| EP | 1855403 | 11/2007 |
| GB | 2247128 | 2/1992 |
| WO | 2007049256 | 5/2007 |

OTHER PUBLICATIONS

International Search Report—PCT/US08/079235, International Search Authority—European Patent Office—Jun. 18, 2009.
Written Opinion—PCT/US08/079235, International Search Authority—European Patent Office—Aug. 18, 2009.

* cited by examiner

*Primary Examiner* — Phirin Sam
*Assistant Examiner* — Hai-Chang Hsiung
(74) *Attorney, Agent, or Firm* — Stanton Braden

(57) ABSTRACT

To assist in minimizing interference, a bandwidth range can have guards on either side to reduce leakage into neighboring bandwidth ranges. However, in relatively low power situations the risk of leakage is reduced. Therefore, the guard bandwidths can be used to open new channels upon which information can be transmitted. Thus, there can be a larger amount of bandwidth used while still retaining protective aspects, such as low interference to neighboring bands. Using the guard bandwidth to transmit new channels facilitates backward compatibility since legacy devices do not commonly monitor the guard bandwidth. These techniques can also be used at high power base stations by advertising a larger guard than necessary to legacy devices and using the additionally created guard bandwidth to transmit new channels.

45 Claims, 14 Drawing Sheets under written description and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

USING GUARD CARRIERS FOR EXTRA CHANNELS

CROSS-REFERENCE

This application claims priority to U.S. Application No. 61/053,604 entitled "SYSTEM AND METHOD TO ENABLE THE USE OF GUARD CARRIERS TO TRANSMIT ADDITIONAL CHANNELS FOR COMMUNICATION", which was filed on May 15, 2008. The entirety of which is herein incorporated by reference.

BACKGROUND

I. Field

The following description relates generally to wireless communications and, more particularly, to using guard bandwidth to transmit information.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region. However, conventional techniques may provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to one aspect there can be a method for communicating information in guard bandwidth. The method can comprise identifying a guard bandwidth in a bandwidth range upon which to place a communication channel. Moreover, the method can comprise placing a communication channel upon the guard bandwidth.

In another aspect, there can be a wireless communication apparatus. The apparatus can include a classifier that identifies a guard bandwidth in a bandwidth range upon which to place a communication channel. In addition, the apparatus can include a designator that places a communication channel upon the guard bandwidth.

With a further aspect, there can be a wireless communications apparatus, comprising means for identifying a guard bandwidth in a bandwidth range upon which to place a communication channel. The apparatus can also comprise means for placing a communication channel upon the guard bandwidth.

In yet another aspect, there can be a machine-readable medium having stored thereon machine-executable instructions. The instructions can be for identifying a guard bandwidth in a bandwidth range upon which to place a communication channel and placing a communication channel upon the guard bandwidth.

With still a further aspect, in a wireless communication system, there can be an apparatus. The apparatus can include a processor configured to identify a guard bandwidth in a bandwidth range upon which to place a communication channel. In addition, the processor can configure to place a communication channel upon the guard bandwidth.

According to one aspect, there can be a method for processing information retained upon a guard bandwidth, comprising collecting information retained in a bandwidth range and determining if collected information resides upon a guard bandwidth of the bandwidth range.

In another aspect, there can be a wireless communication apparatus. The apparatus can comprise an obtainer that collects information retained in a bandwidth range. Moreover, the apparatus can comprise a locator that determines if collected information resides upon a guard bandwidth of the bandwidth range.

With a further aspect, there can be a wireless communication apparatus including means for collecting information retained in a bandwidth range. The apparatus can also include means for determining if collected information resides upon a guard bandwidth of the bandwidth range.

In yet another aspect, there can be machine-readable medium having stored thereon machine-executable instructions for collecting information retained in a bandwidth range. There can also be instructions for determining if collected information resides upon a guard bandwidth of the bandwidth range.

With still a further aspect, a wireless communication system can be used. The system can include an apparatus with a processor configured to collect information retained in a bandwidth range. The processor can also configure to determine if collected information resides upon a guard bandwidth of the bandwidth range.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
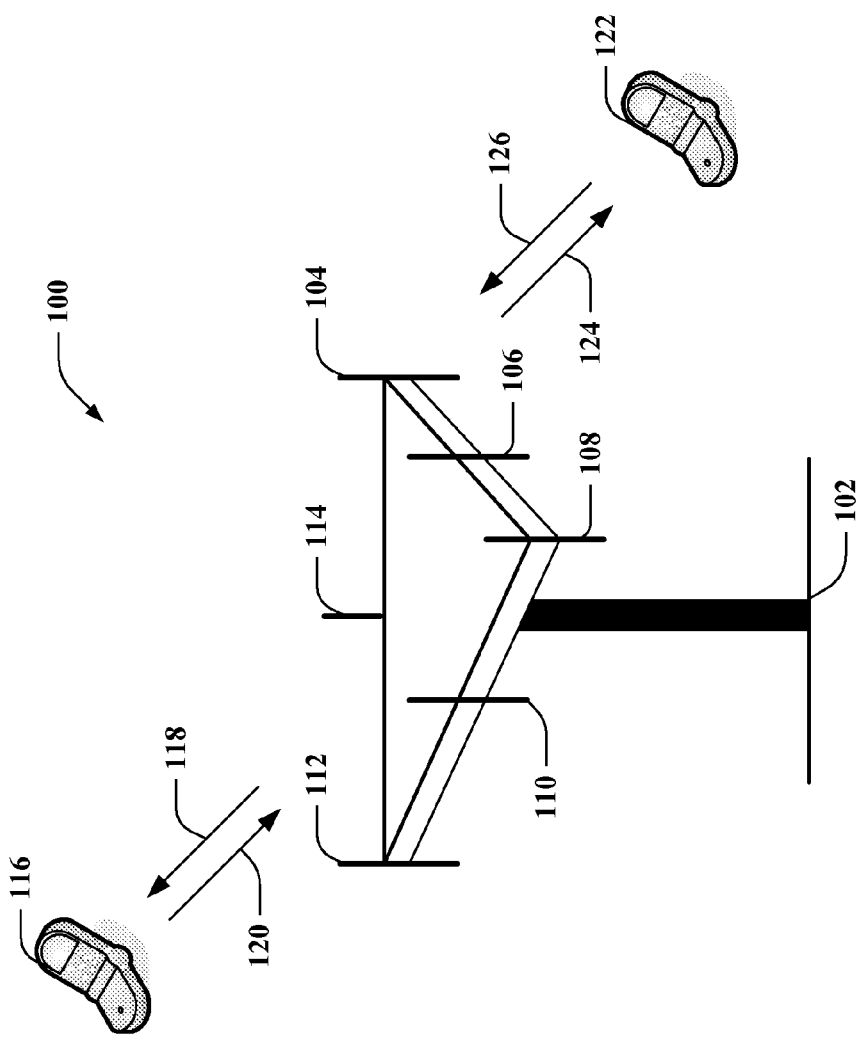
FIG. 1 is an illustration of a wireless communication system in accordance with various aspects set forth herein.

The techniques described herein may be used for various wireless communication systems such as Code Division Multiple Access (CDMA), Time division multiple access (TDMA), Frequency Division Multiple Access (FDMA), Orthogonal Frequency-Division Multiple Access (OFDMA), Single Carrier FDMA (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers Interim Standard (IS)-2000, IS-95 and IS-856 standards. A TDMA system may implement a radio technology such as Global System for Mobile Communications (GSM). An OFDMA system may implement a radio technology such as Evolved Universal Terrestrial Radio Access (Evolved UTRA or E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM®, etc. Universal Terrestrial Radio Access (UTRA) and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, in some aspects, the steps and/or actions of a method or algorithm can reside as one or any combination or set of codes and/or instructions on a machine readable medium and/or computer readable medium, which can be incorporated into a computer program product.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that may include multiple antenna groups. For example, one antenna group may include antennas 104 and 106, another group may comprise antennas 108 and 110, and an additional group may include antennas 112 and 114. Two antennas are illustrated for each antenna group; however, more or fewer antennas may be utilized for each group. Base station 102 may additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 may communicate with one or more mobile devices such as mobile device 116 and mobile device 122; however, it is to be appreciated that base station 102 may communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 may utilize a different frequency band than that used by reverse link 120, and forward link 124 may employ a different frequency band than that employed by reverse link 126, for example. Further, in a time division duplex (TDD) system, forward link 118 and reverse link 120 may utilize a common frequency band and forward link 124 and reverse link 126 may utilize a common frequency band.

The set of antennas and/or the area in which they are designated to communicate may be referred to as a sector of base station 102. For example, multiple antennas may be designed to communicate to mobile devices in a sector of the areas covered by base station 102. In communication over forward links 118 and 124, the transmitting antennas of base station 102 may utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells may be subject to less interference as compared to a base station transmitting through a single antenna to all its mobile devices.

Figure 2:
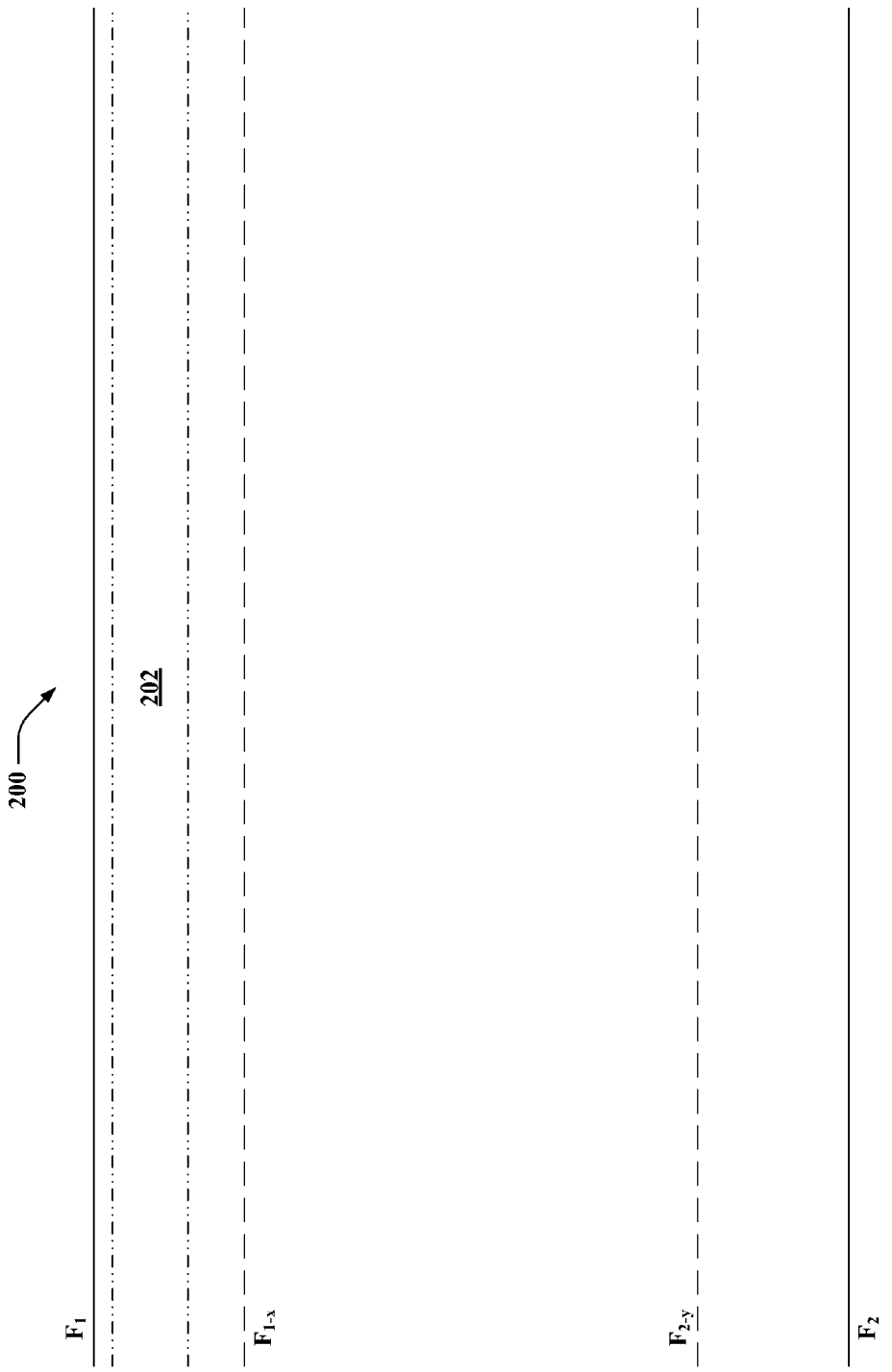
FIG. 2 is an illustration of a representative bandwidth range in accordance with aspects disclosed herein.

Now referring to FIG. 2, an example bandwidth configuration 200 is disclosed using a guard bandwidth. In conventional operation, a base station and mobile device can communicate with one another though a range of bandwidth (e.g., a range of available frequencies). However, there is a possibility that when communication occurs there is leakage from the bandwidth range, especially in situations where a communicating base station operates at relatively high power. This leakage can cause interference to communication in neighboring bandwidth ranges.

To alleviate interference and leakage problems, a guard bandwidth can be used in communication systems. The guard bandwidth is a portion of the bandwidth along the ends of the bandwidth range that is commonly unused. For instance, the bandwidth range can have a range of $F_1$ to $F_2$. Along the edges, there can be limits placed upon the bandwidth range where information is not commonly communicated (e.g., $F_1$ to $F_{1-x}$ and $F_{2-y}$ to $F_2$). The leakage from one frequency band to another frequency band decreases as the frequency separation is increased. The guard band provides this separation. The guard bandwidth can serve two functions—to stop interference from communication on other bandwidth ranges (e.g., others do not interfere with communication) and to minimize impact from communication (e.g., information does not interfere with communication of others).

However, with relatively low power base stations (e.g., femto cell base stations), there typically is minimal leakage and thus minimal interference. Therefore, use of a guard bandwidth (e.g., a guard at all, a standard sized guard) can hamper communications since bandwidth available for communication is not maximized. The guard bandwidth can be used to communicate information when appropriate and thus improve communication. A channel 202 can be placed in a guard bandwidth and used to communicate information to at least one mobile device. Information can be selected for placement upon the channel 202 and transmission can occur to a mobile device. The mobile device can determine if information is retained upon the guard bandwidth and process the information accordingly.

Use of guard bandwidth goes against what is conventionally understood in research circles. Guard bandwidth can be explicitly added sacrificing bandwidth available for data communication to prevent leakage. It would therefore go against research trends to minimize protection provided by the guard bandwidth in order to transmit a larger amount of information. However, an unexpected result theoretically occurs regarding low power base stations such that information can be communicated in the guard bandwidth without increasing leakage (e.g., past a desired threshold). This is so since the leakage power commonly depends on both the transmit power and the amount of guard bandwidth. Leakage power increases as transmit power increases and decreases as frequency separation increases. For a fixed tolerable amount of leakage power, a larger guard bandwidth is typically required for high power base stations and a smaller guard bandwidth could be used for low power base stations.

Use of guard subcarriers for transmitting channels (e.g., extra channels) can facilitate backward compatibility with legacy devices. Since legacy terminals do not commonly monitor the guard subcarriers, they are not impacted by the new channels. New channels can be added while maintaining legacy compatibility by advertising a larger guard than necessary to legacy devices. The "advertised guard" subcarriers can be part of the guard subcarriers and can be used to transmit new channels. For example, an LTE base station operation may require 16 subcarriers of guard to meet the spectral emission requirements. The LTE base station can advertise to legacy LTE devices that the base station uses about 24 guard subcarriers; however, in actual operation only 16 subcarriers of guard are used. In such a case, legacy LTE terminals monitor (e.g., exclusively monitor) N−24 subcarriers, where N is the total number of subcarriers. The remaining 8 advertised guard subcarriers can be used to transmit new channels that are monitored (e.g., exclusively monitor) by new LTE terminals. Since these channels are in the guard bandwidth of legacy LTE terminals, they do not monitor these channels and hence they are not impacted by the new channels. Also, in the above example, since 16 guard subcarriers are sufficient to meet the spectral emissions requirements, even high power base stations can use aspects disclosed herein. It is to be appreciated that the advertised quantity can be the guard bandwidth or the used bandwidth (e.g., total minus guard).

Figure 3:
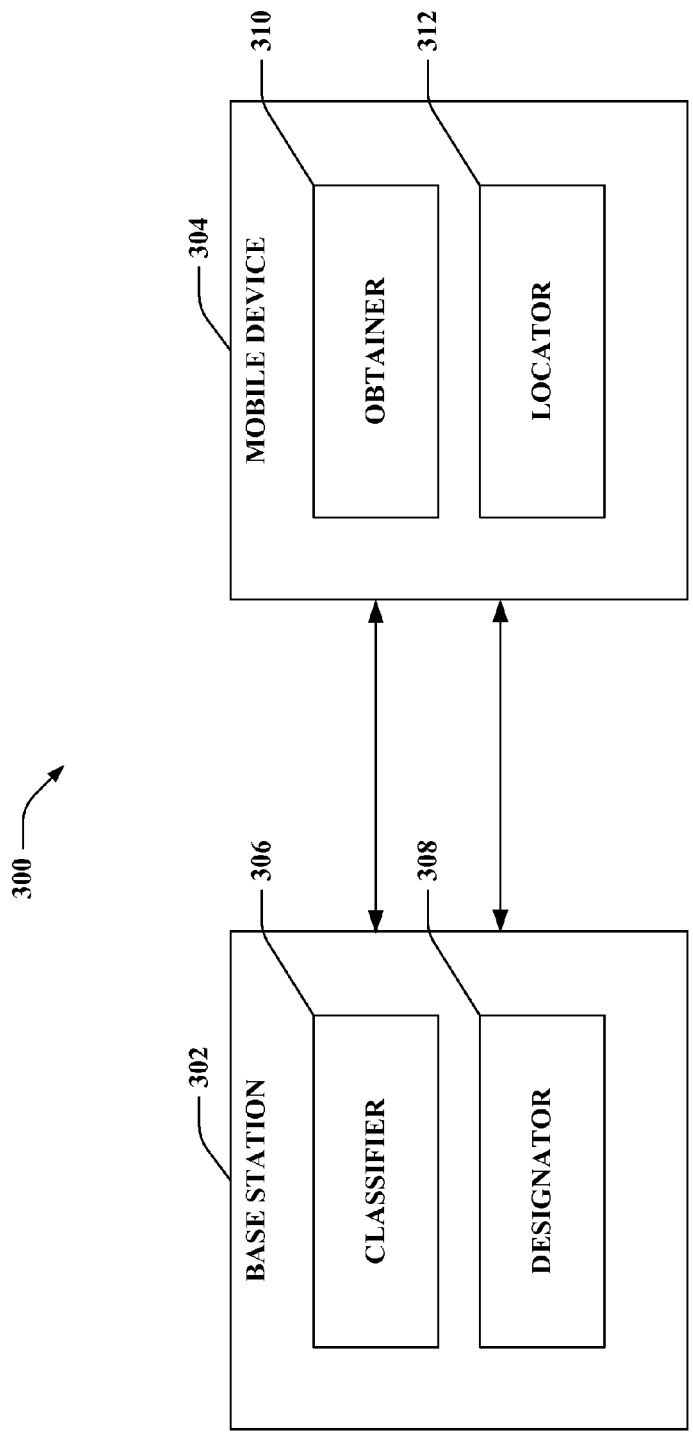
FIG. 3 is an illustration of a representative bandwidth communication system for using a guard bandwidth in data correspondence in accordance with aspects disclosed herein.

Now referring to FIG. 3, an example system 300 is disclosed for communication of information along a guard bandwidth, commonly in conjunction with communication of information in a non-guard portion. The guard bandwidth can be used to transfer specific information, such as information that is suitable for low rate communication between a base station 302 (e.g., a macro base station (NodeB)) and a mobile device 304 (e.g., user equipment (UE)). However, the guard bandwidth can still be used to limit leakage to other bandwidth ranges in addition to hosting a communication channel.

The base station 302 can employ a classifier 306 that identifies a guard bandwidth in a bandwidth range upon which to place a communication channel. Analysis can be performed upon the bandwidth range to determine the guard bandwidth. According to one embodiment, a guard bandwidth is standard on virtually all communications from a base station (e.g., a set amount—such as x frequency, a set percentage of bandwidth range, etc.) and thus the classifier 306 can perform a look-up, perform relatively minor calculations, take a verification measurement, etc. However, depending on other base stations communicating, information that is to be transmitted, as well as on other factors; guard bandwidth can be specific to individual transmission or transmission types and thus classifier 306 can perform more complex analysis to identify the range. A designator 308 can place a communication channel upon the guard bandwidth (e.g., open a channel upon which information can be communicated to the mobile device 304). In addition, the classifier 306 can identify guard subcarriers between bandwidth ranges of different carriers in a multicarrier deployment to place at least one new channel (e.g., placed by the designator 308).

An obtainer 310 can collect information retained in a bandwidth range (e.g., retained in a guard portion and/or non-guard portion). A locator 312 can determine if collected information resides upon a guard bandwidth of the bandwidth range. It is possible that the mobile device 304 communicates with different base stations and therefore some communication sessions can transmit information in a guard bandwidth while some could not use the guard. In one implementation, the mobile device 304 can retain information concerning communication with individual base stations in storage and use the saved information to conserve resources in future usage. For instance, if a particular base station historically sends information though a channel in a guard bandwidth, then the mobile device 304 can assume that the base station 302 communicates information in the guard and automatically modify operation accordingly. It is to be appreciated that functionality disclosed herein as part of the base station 302 can be used in the mobile device 304 and functionality of the mobile device 304 disclosed herein can be used in the base station 302. For instance, the mobile device 304 can include the classifier 306 and/or designator 308.

Figure 4:
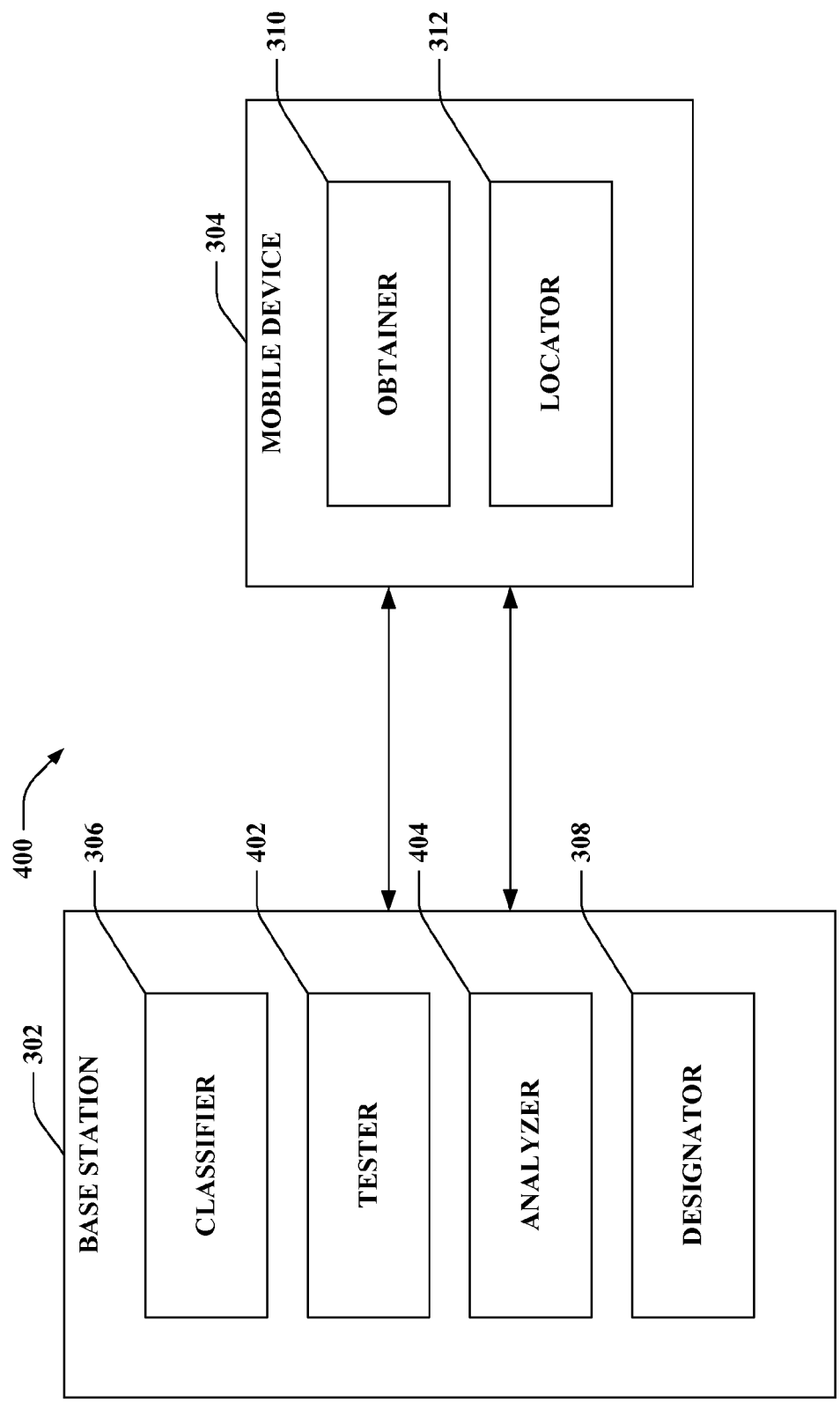
FIG. 4 is an illustration of a representative system for evaluating the guard bandwidth in accordance with aspects disclosed herein.

Now referring to FIG. 4, an example system 400 is disclosed for communication of information through use of a guard bandwidth. The base station 302 can use a classifier 302 to identify if there is a guard bandwidth in a bandwidth range and if so, then where the guard bandwidth is located. This can occur as information is transmitted through the bandwidth range as well as prior to operation (e.g., determining if an anticipated communication is to use a guard bandwidth).

A tester 402 can determine if the guard bandwidth can be used (e.g., is capable of being used, should be used, etc.) to transmit information—commonly, the determination is based upon transmit power of a transmitter (e.g., relatively low power base stations can use the guard bandwidth). It is possible that some NodeB and/or UE that use guard bandwidth do not meet specific spectral marks. However, when relatively low power is involved (e.g., lower than a macro NodeB), at least some part of the guard bandwidth can be used for transmission. If there is an initial determination by the tester 402 that transmission power is too high for reliable communication in the guard bandwidth (e.g., estimated leakage is beyond a desired amount), then the tester 402 can determine if power of the base stations can be lowered to minimize leakage and thus allow for a guard channel.

The base station 302 can employ an analyzer 404 that determines where in the guard bandwidth to place the communication channel. While a channel can be placed upon all of a guard or multiple channels can be used to occupy all of a guard, it can be desirable to only use a portion of the guard in at least some situations. For example, due to anticipated leakage the analyzer 404 can determine that some guard should be left open. Based upon the determination and/or characteristic evaluation (e.g., importance of information to be placed in guard, importance of information in bandwidth range, anticipated leakage, etc.), the analyzer 404 can determine where the channel should be placed in the guard. For example, placement can be in the middle of the guard, toward or against an edge or the guard, random placement, etc. Moreover, the analyzer 404 can select a size of the channel based upon evaluation of information to be communicated.

According to one embodiment, the analyzer 404 can choose placement of the channel in the guard bandwidth such that the channel does not cause interference. In addition, placement can be chosen such that data upon the channel is not interfered with by existing or anticipated communications in a data portion of the non-guard bandwidth as well as other bandwidth ranges. In one implementation, protection of the channel can be procured through use of a localized guard bandwidth (e.g., the new channel has its own guard bandwidth). It is to be appreciated that localized guard bandwidth could be useful to channels that are not transmitted in the guard bandwidth as well.

The base station 302 can use the bandwidth range to communicate globally (e.g., to multiple mobile devices within an area) or directly (e.g., to a specific mobile device). Based upon this communication, the mobile device 304 can collect information in the bandwidth range through an obtainer 3 10. The mobile device 304 can use a locator 312 that determines if collected information resides upon a guard bandwidth of the bandwidth range.

Figure 5:
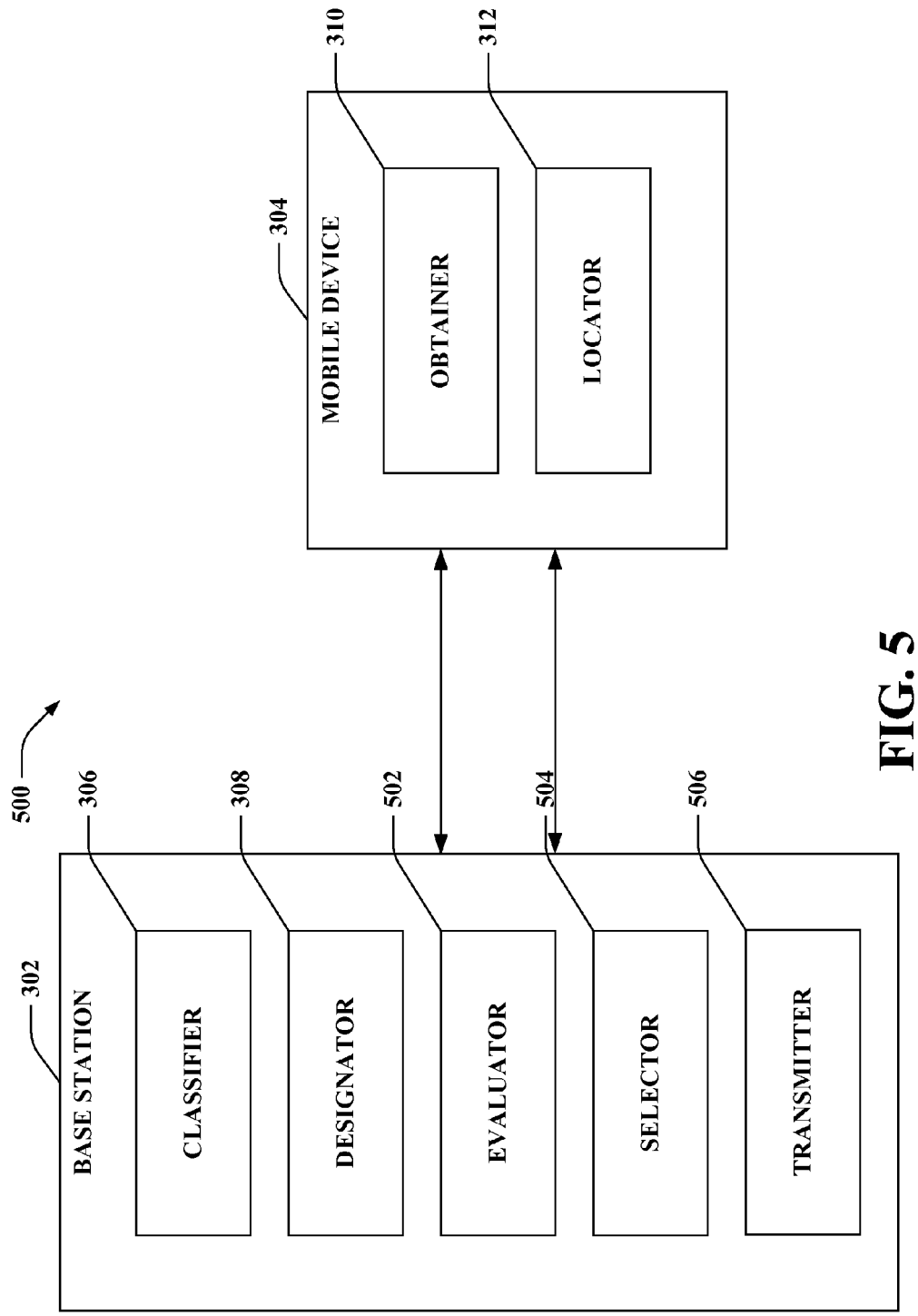
FIG. 5 is an illustration of a representative system for transmission of information along a guard bandwidth in accordance with aspects disclosed herein.

Now referring to FIG. 5, an example system 500 is disclosed for communicating information upon a guard bandwidth. A base station 302 can communicate information though a bandwidth range to a mobile device 304. The base station 302 can use a classifier 306 that identifies a guard bandwidth in a bandwidth range upon which to place a communication channel. Upon the identification, a designator 308 can place a communication channel upon the guard bandwidth that can be used to communicate information.

In addition to placement of a communication channel, information can be designated for communication upon the channel. According to one embodiment, the channel can be designated and then filled with information for communication. However, according to an alternative configuration, information can be selected and based upon the selection a channel can be created and placed. The base station 302 can use an evaluator 502 that determines information to designate for transmission upon the communication channel. Used in conjunction with the evaluator 502 can be a selector 504 that designates information for transmission upon the communication channel. Thus, the evaluator 502 can analyze information that is to be transmitted and the selector 504 can choose information for use in the guard as a function of a result of the analysis. In one implementation, the determination of information to designate is based upon communication rate.

For example, the channel in the guard bandwidth can be used for low rate communication and employ time reuse or frequency reuse. In time reuse multiple messages are sent from different sources at different times on the same channel. A message is conveyed when there are no collisions. If there is a collision (e.g., two or more base stations and/or mobile devices transmit at one time),the base station can attempt retransmission at a later time (e.g., using a randomly selected delay). In frequency reuse, multiple messages can be conveyed at one time (e.g., though use of beacon based signaling). Examples of messages that can be sent on the channel can include a resource utilization message (RUM) and/or low reuse preamble (LRP), as well as other low rate control messages. The RUM can be a request to neighboring entities (e.g., base stations and/or mobile devices) to vacate certain resources to enable improved functionality. The LRP can be a message sent to enable a device (e.g., mobile device) to identify neighboring devices (e.g., base stations) even if the neighboring devices have relatively low power. Furthermore, the base station 302 can use a transmitter 506 that emits the designated information along the communication channel to the mobile device 304. The mobile device 304 can include an obtainer 310 that collects information retained in a bandwidth range and a locator 312 that determines if collected information resides upon a guard bandwidth of the bandwidth range.

Figure 6:
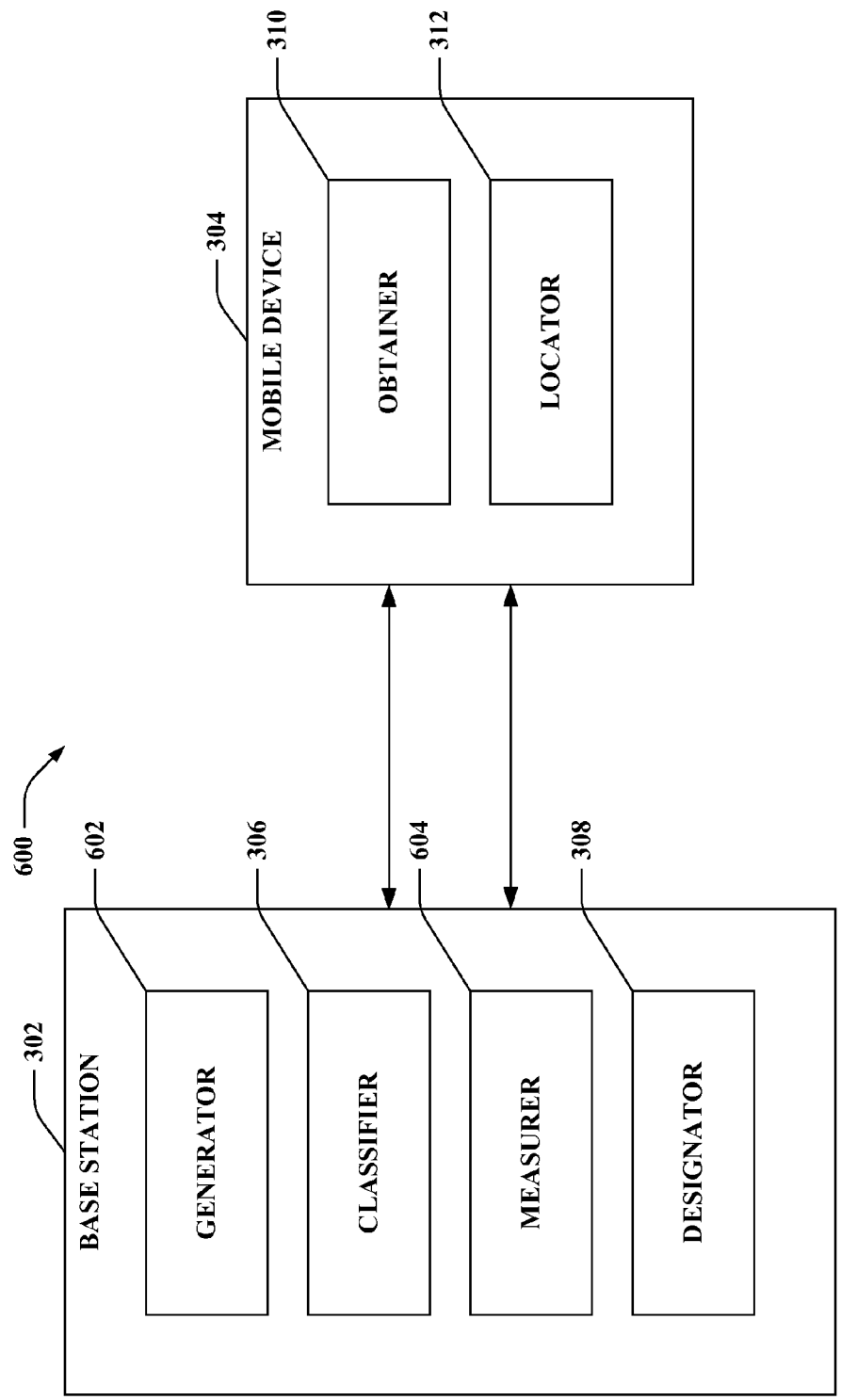
FIG. 6 is an illustration of a representative system for producing a communication bandwidth in accordance with aspects disclosed herein.

Now referring to FIG. 6, an example system 600 is disclosed for communicating information though a channel in a guard bandwidth. A base station 302 can communication with a mobile device 304 through a bandwidth range produced by a generator 602. The generator 602 can evaluate pre-defined constraints for a bandwidth range as well as actively analyze conditions to determine a bandwidth range to use. As part of producing the bandwidth range, the generator 602 can also produce the guard bandwidth. In operation, the generator 602 can advertise a larger than necessary guard bandwidth and use the additional guard bandwidth to add new channels. The generator 602 can also advertise a first set of guard subcarriers on a first channel monitored by a first class of devices (e.g., legacy devices) and advertise a second set of guard subcarriers on a second channel monitored by a second class of devices (e.g., non-legacy devices). In multicarrier operation, a large bandwidth range is split into multiple smaller bandwidth segments, each of which may be referred to as a carrier. Some of the carriers could be used to employ communication systems that operate independently from the other carriers, at least as far as some UEs (e.g. legacy UEs) are concerned. That is, the system 600 can be deployed such that legacy UEs (e.g., that do not support multicarrier operation) can communicate to the base station through one of these carriers in a manner similar to the case when only that carrier is present. In such a system, if a guard bandwidth is present between the two carriers' used bandwidths, it can be used for transmitting new channels to non-legacy UEs. A classifier 306 can identify the guard bandwidth in the bandwidth range upon which to place a communication channel. The base station 302 can utilize a measurer 604 that identifies when to use the guard bandwidth to transmit information. If appropriate, a designator 308 can place a communication channel upon the guard bandwidth Artificial intelligence techniques can be used in various aspects disclosed herein—it is to be appreciated that determinations made herein can be practiced through use of artificial intelligence techniques. These techniques can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. The mobile device 304 can include an obtainer 310 that collects information retained in a bandwidth range and a locator 312 that determines if collected information resides upon a guard bandwidth of the bandwidth range.

Figure 7:
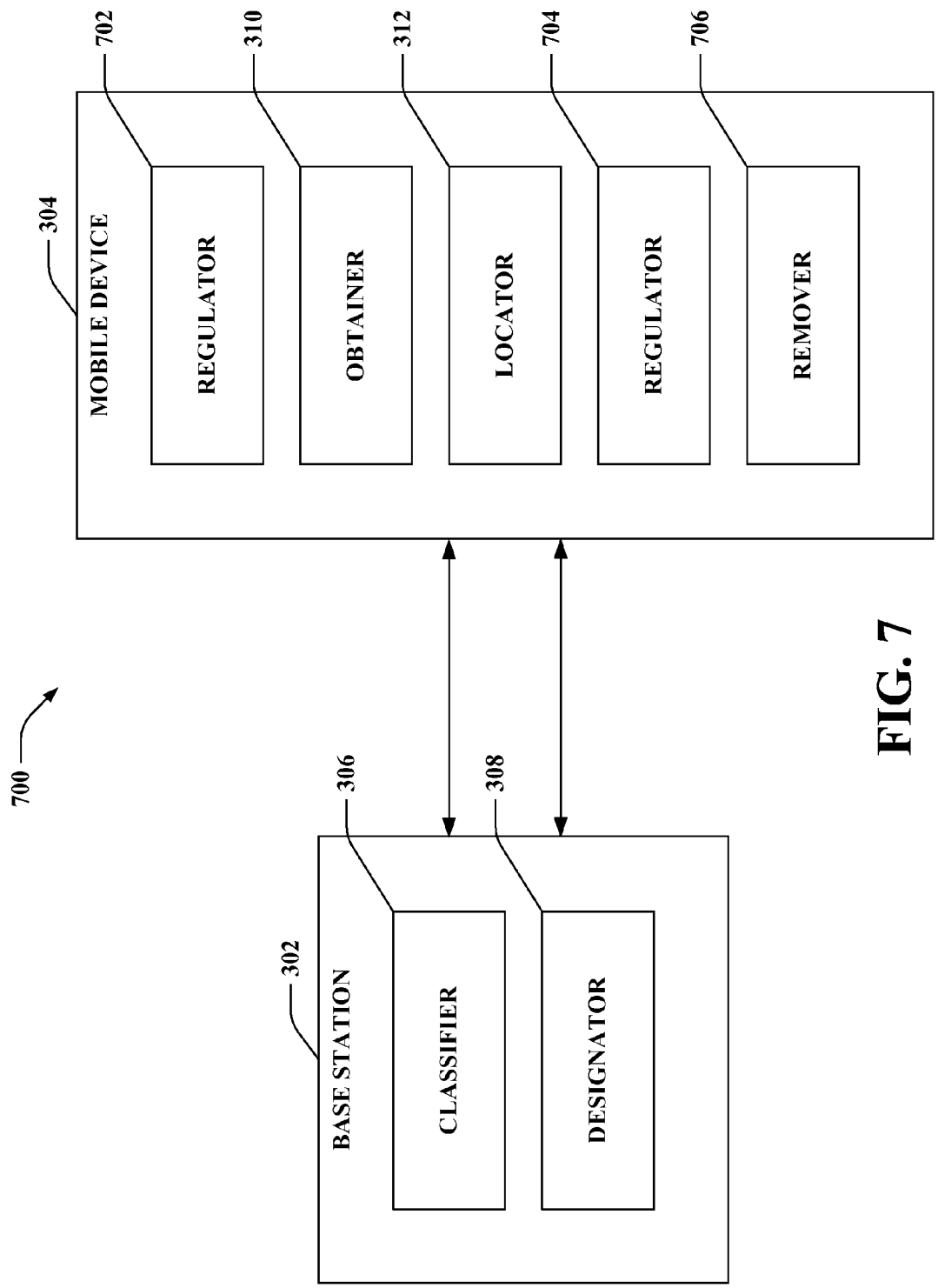
FIG. 7 is an illustration of a representative communication system with a detailed mobile device for processing information retained in a guard bandwidth in accordance with aspects disclosed herein.

Now referring to FIG. 7, an example system 700 is disclosed for using a guard bandwidth to communicate information highlighting a detailed mobile device 304. A base station 302 can include a classifier 306 that identifies a guard bandwidth in a bandwidth range upon which to place a communication channel. In addition, the base station 302 can use a designator 308 that places a communication channel upon the guard bandwidth.

The mobile device 304 can process information in the bandwidth range (e.g., guard portions and non-guard portions). A regulator 702 can be used that prepares for collection of information retained in a bandwidth range. Preparation for collection can include activating the mobile device 304 (e.g., turning on the mobile device 304), enabling the mobile device 304 to collect information, creating a link with a base station, changing a frequency range that are monitored, and the like. An obtainer 310 can be used that collects information retained in a bandwidth range. The collected information can be evaluated (e.g., through use of artificial intelligence techniques) and based upon a result of the evaluation a locator 312 that determines if collected information resides upon a guard bandwidth of the bandwidth range.

Based upon a configuration of the mobile device 304, filtering can occur to improve operation. Filtering is generally used to remove signals and noise outside of the bandwidth range where information is expected. For example, the mobile device 304 can expect information within a bandwidth range without the guards. A locator 312 can determine that the expectation is incorrect and thus filtering should be expanded to include the guard bandwidth. Likewise, the mobile device 304 can anticipate information in a guard yet the guard is not used and filtering should be reduced to improve efficiency. Therefore, there can be use of a regulator 704 that limits filtering upon a negative determination or expands filtering upon a positive determination. For example, if a half of the guard bandwidth that is closest to the bandwidth available for data includes a channel, then filtering can be expanded to include that half of the guard. A remover 706 can be used that extracts the collected information (e.g., separates guard and non-guard information). Moreover, the remover 706 can compare the at least two sets of guard subcarriers and retain information in the largest set of non-guard subcarriers determined through the comparison, the obtainer 310 collects the at least two sets of guard subcarriers.

Figure 8:
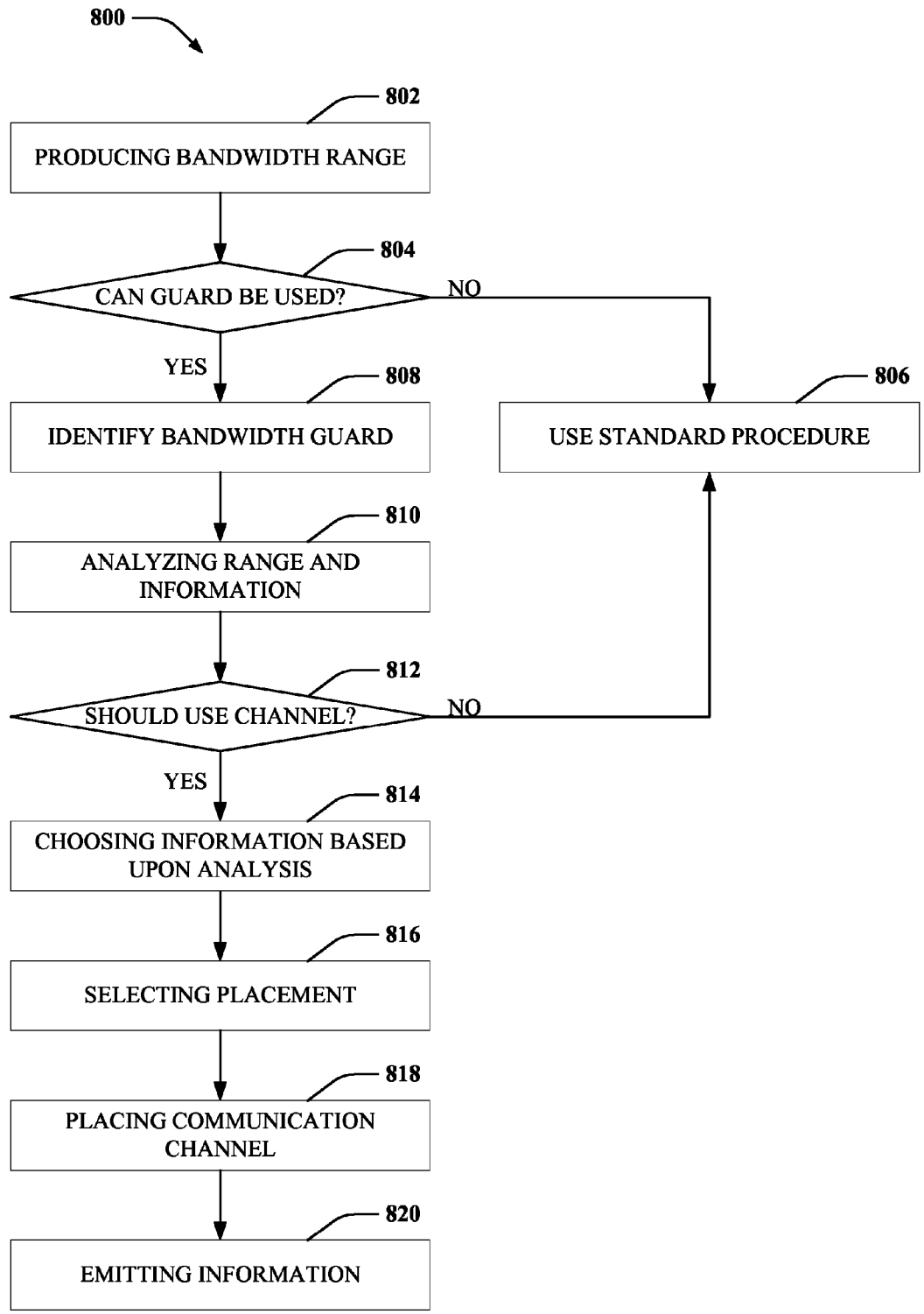
FIG. 8 is an illustration of a representative methodology for communication of information upon a guard bandwidth in accordance with aspects disclosed herein.
Figure 9:
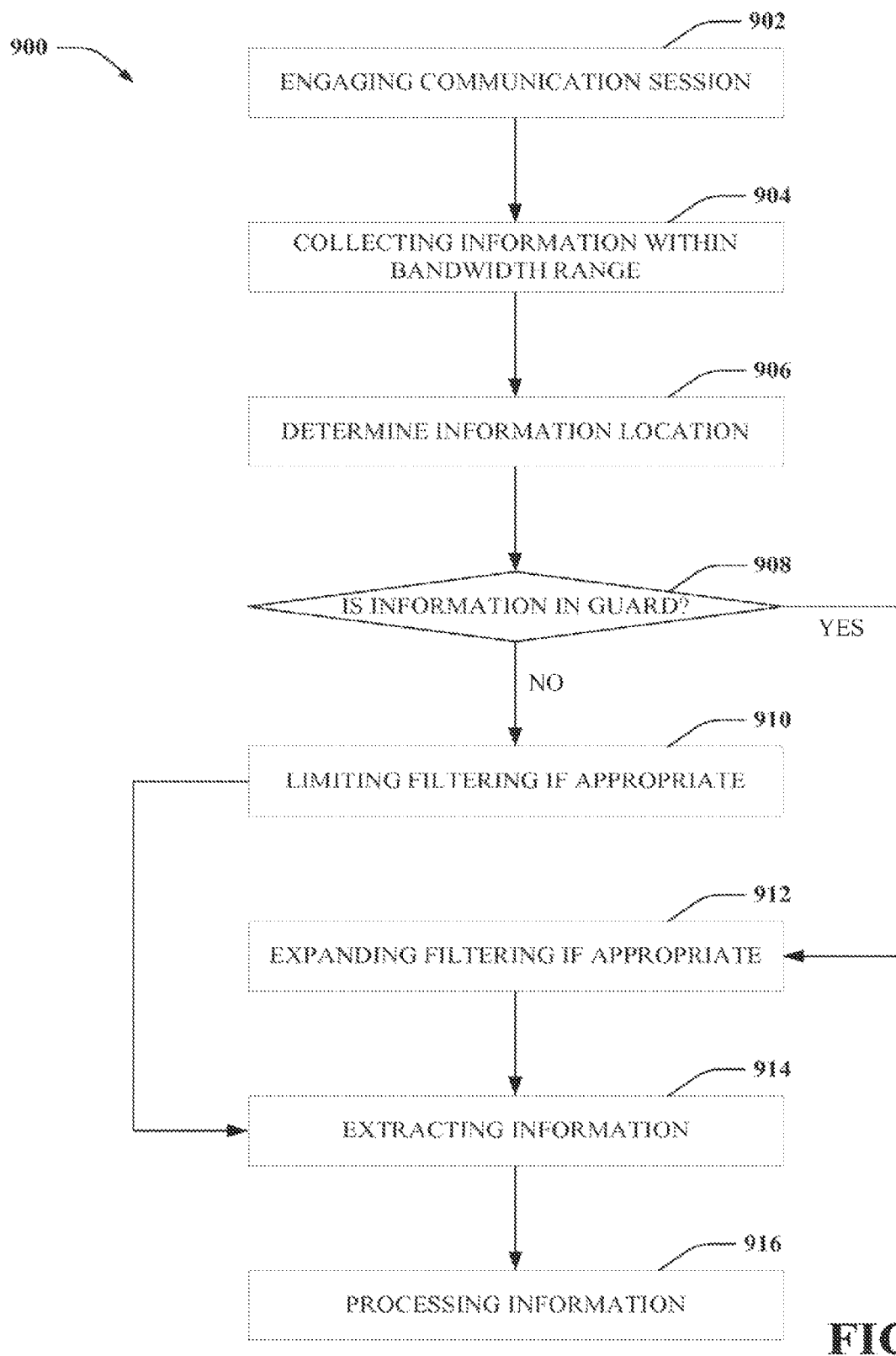
FIG. 9 is an illustration of a representative methodology for processing information placed upon a channel of a guard bandwidth in accordance with aspects disclosed herein.

Referring to FIGS. 8-9, methodologies relating to communication through a guard bandwidth. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Now referring to FIG. 8, an example methodology 800 is disclosed for communicating information on a guard bandwidth. A bandwidth range (e.g., including a guard bandwidth) can be produced through event 802. According to one embodiment, information to be transmitted and/or bandwidth used by other entities are evaluated and based upon a result of the evaluation and bandwidth range is produced (e.g., reserved, used, etc.)

A check 804 can be used to determine if there is a guard portion as part of the bandwidth range and if the guard portion is capable of use. For example, if a base station is of too high a power (e.g., known at time of productions), then the check can determine that the standard procedure should be used at act 806. Check 804 can represent identifying when to use the guard bandwidth to transmit information. If it is determined that the guard can be used, then the methodology can continue to action 808.

At action 808 there can be identifying a guard bandwidth in a bandwidth range upon which to place a communication channel. The bandwidth range as well as information that could be transmitted can be analyzed at action 810. Action 810 can include determining information to designate for transmission (e.g., upon a communication channel).

Another check 812 can occur determining if a channel should be used—if it is determined that the channel should not be used, then the methodology 800 can continue to act 806. The check 812 can be based upon a result of the analysis that occurs at event 81 0. For example, if there is a small amount of information and a wide non-guard bandwidth available, then it can be determined that a channel in the guard portion should not be used.

If the channel should be used, then information for transmission can be selected at act 814. Thus, act 814 can represent designating information for transmission upon the communication channel. With information selected, there can be determining where in the guard bandwidth to place the communication channel at event 816. Placing a communication channel upon the guard bandwidth can occur at action 818 and emitting the designated information along the communication channel can take place at event 820.

Now referring to FIG. 9, an example methodology 900 is disclosed for processing information communicated through a bandwidth range. A communication session can be engaged at act 902, commonly among at least one base station and at least one mobile device. Act event 904, there can be collecting information retained in a bandwidth range.

Determining if collected information resides upon a guard bandwidth of the bandwidth range or a non-guard portion can occur at action 906. A check 908 can occur determining if a filter range is appropriate for where information is kept. If filtering should be limited, then the methodology 900 can continue to action 910 to perform appropriate limiting. If filtering should be expanded, then the methodology 900 can progress to act 912 for expansion. Action 910 and act 912 can represent limiting filtering upon a negative determination or expanding filtering upon a positive determination. While not shown, the check 908 can also result in determining filtering is appropriate and should not be changed. Regardless of the outcome of check 908, the methodology 900 can ultimately move to event 914 for extracting the collected information. The extracted information can be processed at act 916 (e.g., storing the extracted information, altering operation based upon the extracted information, and the like).

It will be appreciated that, in accordance with one or more aspects described herein, inferences can be made regarding how to use a guard bandwidth, how to extract information, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to transmitting information though a channel placed in a guard bandwidth. By way of further illustration, an inference may be made related to selecting a number of physical frames as a wakeup period parameter based upon intended application, desired power savings, etc. It will be appreciated that the foregoing examples are illustrative in nature and are not intended to limit the number of inferences that can be made or the manner in which such inferences are made in conjunction with the various embodiments and/or methods described herein.

Figure 10:
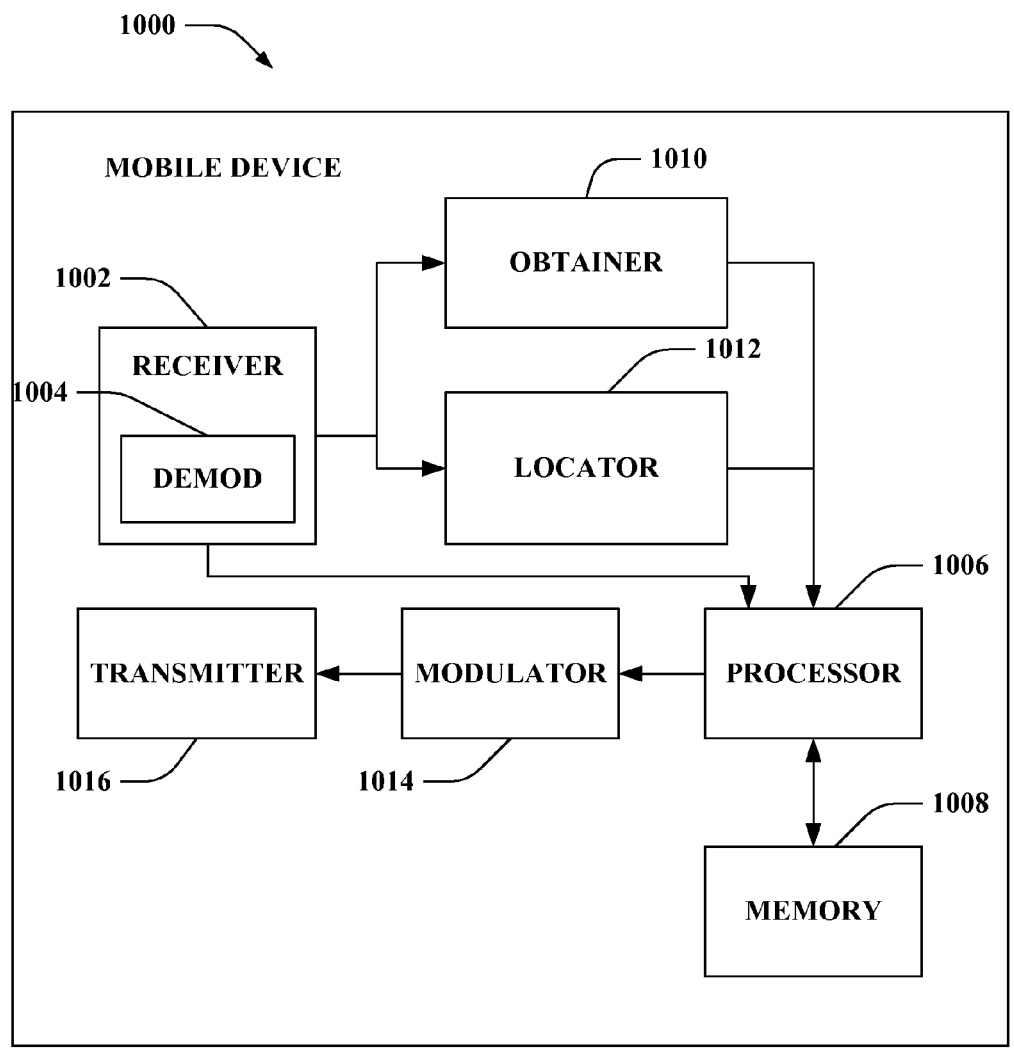
FIG. 10 is an illustration of an example mobile device that facilitates use of a data channel upon a guard bandwidth in accordance with aspects disclosed herein.

FIG. 10 is an illustration of a mobile device 1000 that facilitates using guard bandwidth to communicate information. Mobile device 1000 comprises a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1016, a processor that controls one or more components of mobile device 1000, and/or a processor that both analyzes information received by receiver 1002, generates information for transmission by transmitter 1016, and controls one or more components of mobile device 1000.

Mobile device 1000 can additionally comprise memory 1008 that is operatively coupled to processor 1006 and that may store data to be transmitted, received data, information related to available channels, data associated with analyzed signal and/or interference strength, information related to an assigned channel, power, rate, or the like, and any other suitable information for estimating a channel and communicating via the channel. Memory 1008 can additionally store protocols and/or algorithms associated with estimating and/or utilizing a channel (e.g., performance based, capacity based, etc.).

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Processor 1002 is further operatively coupled to an obtainer 1010 and/or to a locator 1012. The obtainer 1010 and/or locator 1012 can include functionality related to other similar and/or like-named entities disclosed herein. The obtainer 1010 can collect information retained in a bandwidth range. In addition, the locator 1012 can determine if collected information resides upon a guard bandwidth of the bandwidth range. Mobile device 1000 still further comprises a modulator 1014 and a transmitter 1016 that transmits a signal (e.g., base CQI and differential CQI) to, for instance, a base station, another mobile device, etc. Although depicted as being separate from the processor 1006, it is to be appreciated that the obtainer 1010 and/or locator 1012 may be part of processor 1006 or a number of processors (not shown).

Figure 11:
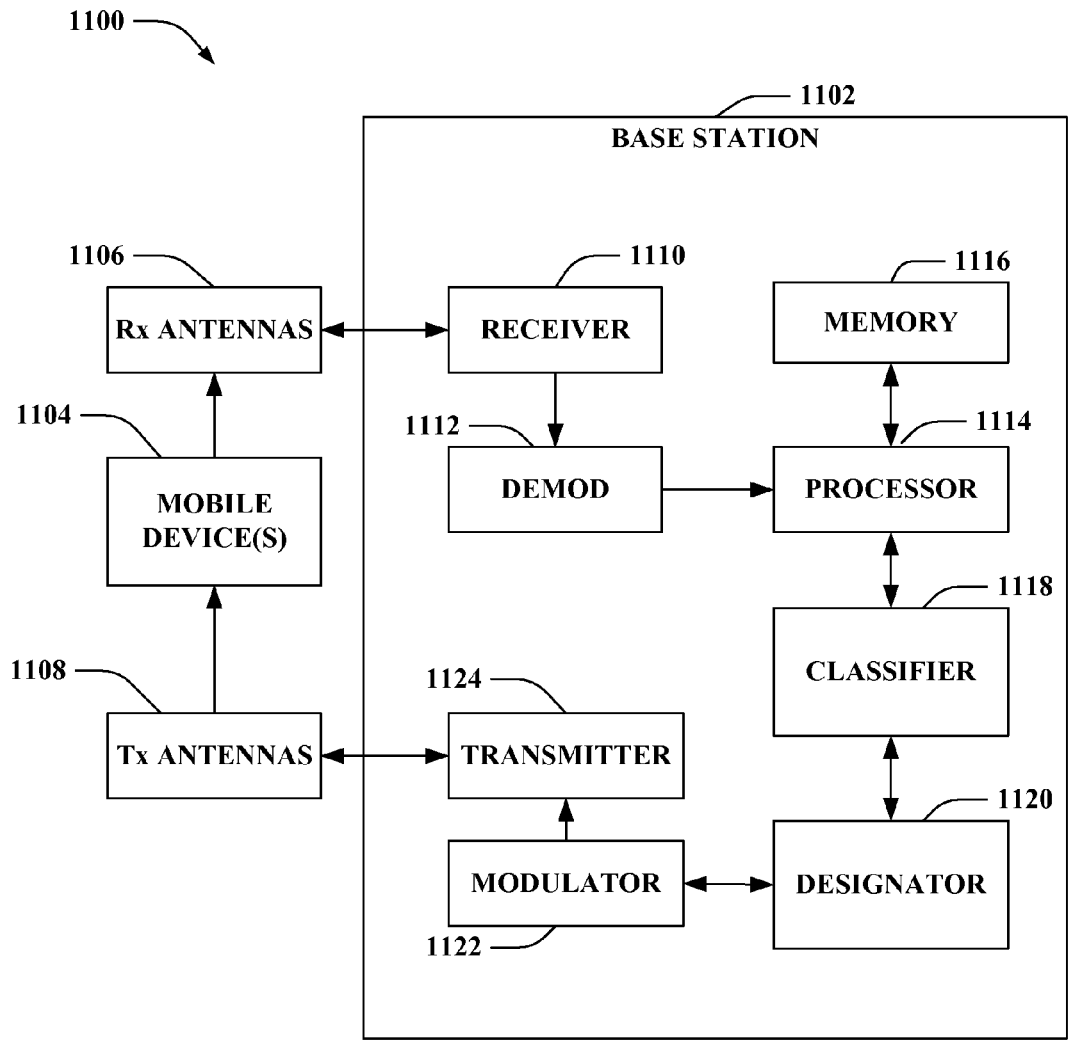
FIG. 11 is an illustration of an example system that facilitates use of a data channel upon a guard bandwidth in accordance with aspects disclosed herein.

FIG. 11 is an illustration of a system 1100 that facilitates communication of information through a guard bandwidth. System 1100 comprises a base station 1102 (e.g., access point, . . . ) with a receiver 1110 that receives signal(s) from one or more mobile devices 1104 through a plurality of receive antennas 1106, and a transmitter 1122 that transmits to the one or more mobile devices 1104 through a plurality of transmit antennas 1108. Receiver 1110 can receive information from receive antennas 1106 and is operatively associated with a demodulator 1112 that demodulates received information. Demodulated symbols are analyzed by a processor 1114 that can be similar to the processor described above with regard to FIG. 7, and which is coupled to a memory 1116 that stores information related to estimating a signal (e.g., pilot) strength and/or interference strength, data to be transmitted to or received from mobile device(s) 1104 (or a disparate base station (not shown)), and/or any other suitable information related to performing the various actions and functions set forth herein.

Processor 1114 is further operatively coupled to a classifier 1118 and or a designator 1120. The classifier 1118 can identify a guard bandwidth in a bandwidth range upon which to place a communication channel, commonly based upon a result of analysis. The designator 1120 can place a communication channel upon the guard bandwidth. Further, processor 1114 may effectuate transmitting over the forward link channel to convey a FLAB message or an ARB message. Information to be transmitted may be provided to a modulator 1122. Modulator 1122 can multiplex the information for transmission by a transmitter 1126 through antenna 1108 to mobile device(s) 1104. Although depicted as being separate from the processor 1114, it is to be appreciated that the classifier 1118 and/or the designator 1120 may be part of processor 1114 or a number of processors (not shown).

Figure 12:
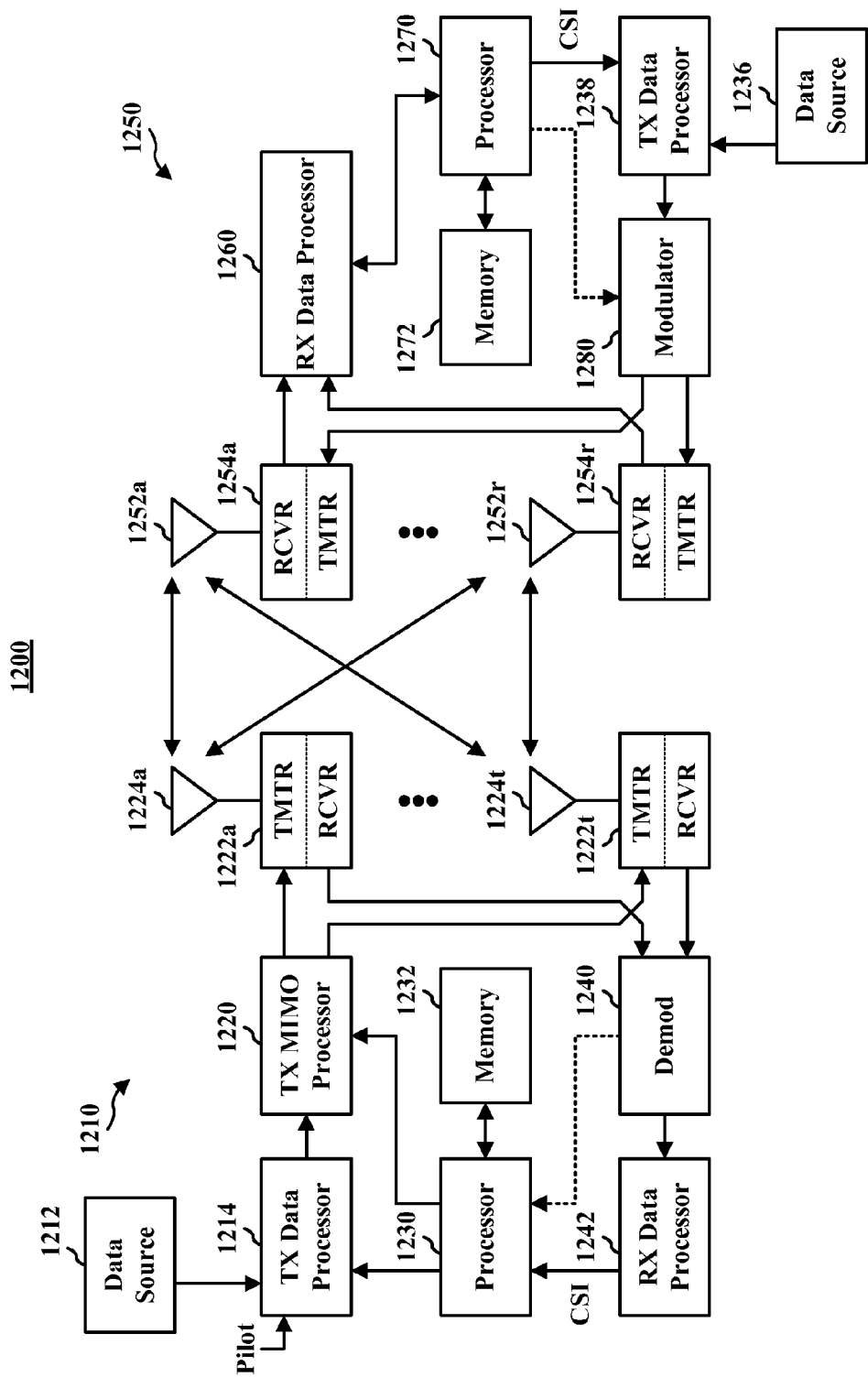
FIG. 12 is an illustration of an example wireless network environment that can be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 may include more than one base station and/or more than one mobile device, wherein additional base stations and/or mobile devices may be substantially similar or different from example base station 1210 and mobile device 1250 described below. In addition, it is to be appreciated that base station 1210 and/or mobile device 1250 may employ the systems (FIGS. 1, 3-7 and 10-11) and/or methods (FIGS. 8-9) described herein to facilitate wireless communication there between.

At base station 1210, traffic data for a number of data streams is provided from a data source 1212 to a transmit (TX) data processor 1214. According to an example, each data stream may be transmitted over a respective antenna. TX data processor 1214 formats, codes, and interleaves the traffic data stream based on a particular coding scheme selected for that data stream to provide coded data.

The coded data for each data stream may be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and may be used at mobile device 1250 to estimate channel response. The multiplexed pilot and coded data for each data stream may be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream may be determined by instructions performed or provided by processor 1230.

The modulation symbols for the data streams may be provided to a TX MIMO processor 1220, which may further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 may receive and process the $N_R$ received symbol streams from $N_R$ receivers 1254 based on a particular receiver processing technique to provide $N_T$ "detected" symbol streams. RX data processor 1260 may demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 may periodically determine which preceding matrix to utilize as discussed above. Further, processor 1270 may formulate a reverse link message comprising a matrix index portion and a rank value portion.

The reverse link message may comprise various types of information regarding the communication link and/or the received data stream. The reverse link message may be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 may process the extracted message to determine which preceding matrix to use for determining the beamforming weights.

Processors 1230 and 1270 may direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 13:
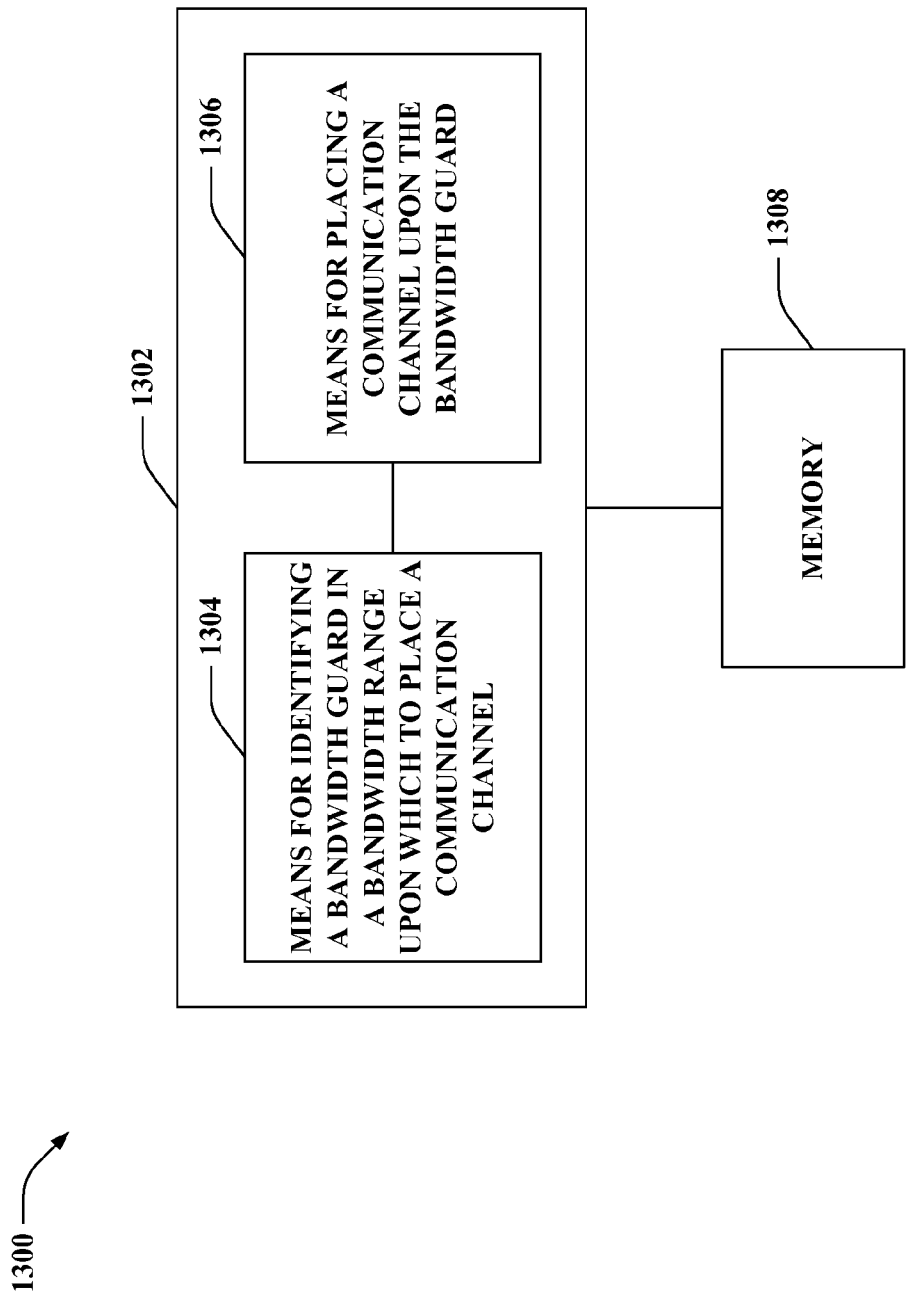
FIG. 13 is an illustration of an example system that facilitates use a guard bandwidth to transfer information in accordance with aspects disclosed herein.

With reference to FIG. 13, illustrated is a system 1300 that effectuates communication of information through a guard bandwidth. For example, system 1300 may reside at least partially within a mobile device. It is to be appreciated that system 1300 is represented as including functional blocks, which may be functional blocks that represent functions implemented by a processor, software, or combination thereof (e.g., firmware). System 1300 includes a logical grouping 1302 of means that can act in conjunction. For instance, logical grouping 1302 may include means for identifying a guard bandwidth in a bandwidth range upon which to place a communication channel 1304. Moreover the logical grouping 1302 can include means for placing a communication channel upon the guard bandwidth 1308. The logical grouping 1302 can also include and thus represent means for determining if the guard bandwidth can be used to transmit information based upon transmit power of a transmitter, means for determining where in the guard bandwidth to place the communication channel, means for designating information for transmission upon the communication channel, means for determining information to designate for transmission upon the communication channel, means for emitting the designated information along the communication channel, means for using guard subcarriers between bandwidth ranges of different carriers in a multicarrier deployment to place the communication channel, means for means for advertising a larger than necessary guard bandwidth and using the additional guard bandwidth to add new channels, means for advertising a first set of guard subcarriers on a first channel monitored by a first class of devices, and means for advertising a second set of guard subcarriers on a second channel monitored by a second class of devices, means for identifying when to use the guard bandwidth to transmit information, and/or means for producing the bandwidth range. Additionally, system 1300 may include a memory 1308 that retains instructions for executing functions associated with means 1304 and 1306. While shown as being external to memory 1308, it is to be understood that one or more of means 1304 and 1306 may exist within memory 1308.

Figure 14:
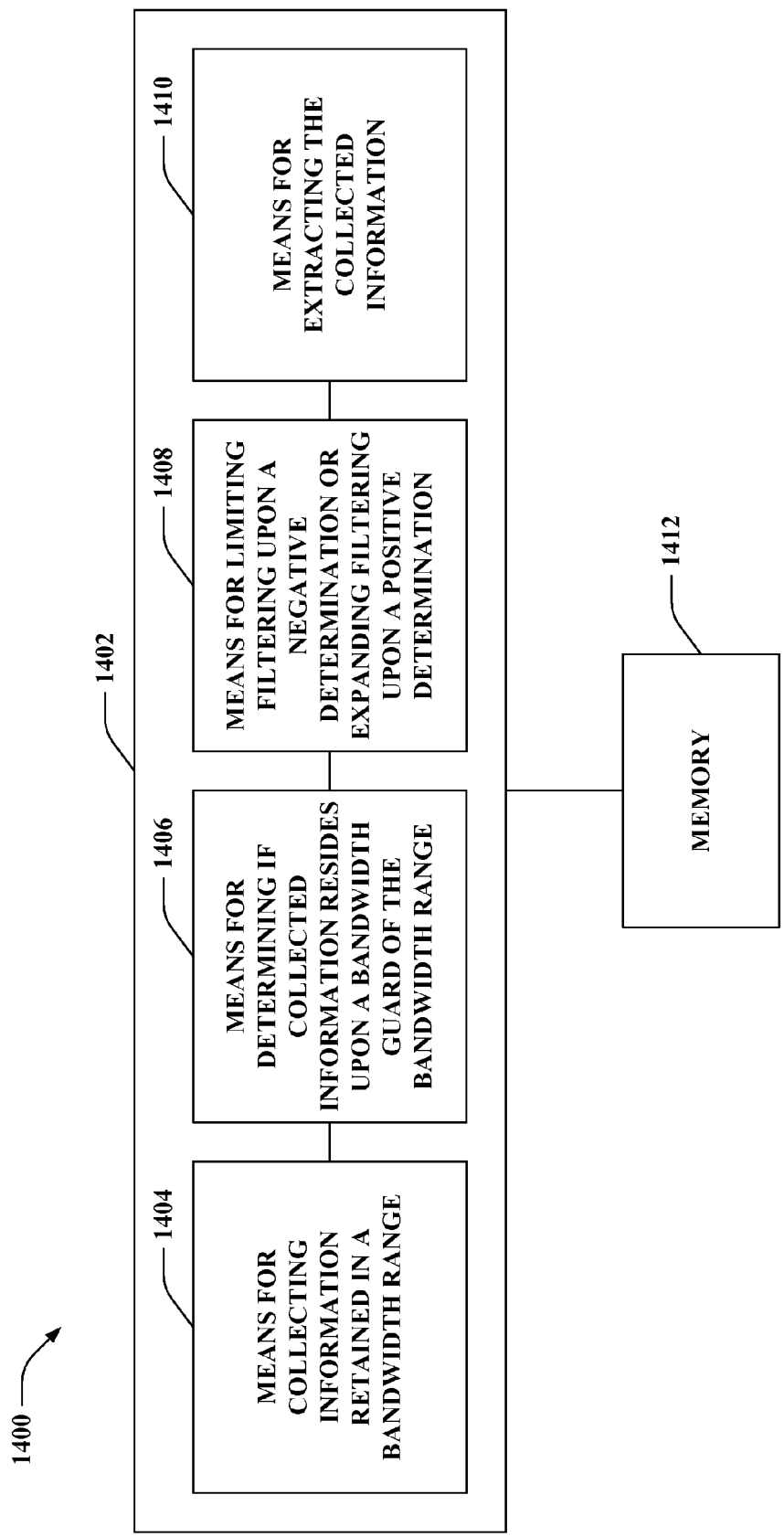
FIG. 14 is an illustration of an example system that processes information transmitted through a guard bandwidth in accordance with aspects disclosed herein.

Turning to FIG. 14, illustrated is a system 1400 that calculates reduced feedback by employing successive interference operations on permuted codewords. System 1400 may reside within a base station, for instance. As depicted, system 1400 includes functional blocks that may represent functions implemented by a processor, software, or combination thereof (e.g. firmware). System 1400 includes a logical grouping 1402 of means that facilitate controlling forward link transmission. Logical grouping 1402 may include means for collecting information retained in a bandwidth range 1404 as well as means for determining if collected information resides upon a guard bandwidth of the bandwidth range 1406. Moreover, the logical grouping 1402 can include means for limiting filtering upon a negative determination or expanding filtering upon a positive determination 1408 as well as means for extracting the collected information 1410. The logical grouping 1402 can also include means for comparing at least two sets of guard subcarriers and means for using the smallest set of guard subcarriers determined through the comparison, means for collecting information retained in the bandwidth range includes means for collection of the at least two sets of guard subcarriers. Additionally, system 1400 may include a memory 1412 that retains instructions for executing functions associated with means 1404, 1406, 1408, and 1410. While shown as being external to memory 1412, it is to be understood that means 1404, 1406, 1408, and 1410 may exist within memory 1412.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for communicating information, in a guard band, comprising:
    identifying a guard bandwidth in a bandwidth range upon which to place a communication channel on the guard band;
    placing the communication channel upon the guard band over the guard bandwidth;
    advertising a first set of guard subcarriers of the guard band on a first channel monitored by a first class of devices; and
    advertising a second set of guard subcarriers of the guard band on a second channel monitored by a second class of devices, the second set of guard subcarriers being a subset of the first set of guard subcarriers wherein the second class of devices use subcarriers, included within the complement of the second set of guard subcarriers in the first set of guard subcarriers, for communications rather than as guard subcarriers.

2. The method of claim 1, further comprising determining if the guard bandwidth can be used to transmit information based upon transmit power of a transmitter.

3. The method of claim 1, further comprising using guard subcarriers between bandwidth ranges of different carriers in a multicarrier deployment to place the communication channel.

4. The method of claim 1, further comprising designating information for transmission upon the communication channel.

5. The method of claim 4, further comprising determining information to designate for transmission upon the communication channel.

6. The method of claim 5, wherein the determination of information to designate is based upon communication rate.

7. The method of claim 4, further comprising emitting the designated information along the communication channel.

8. The method of claim 1, further comprising advertising a larger than necessary guard bandwidth and using the larger than necessary guard bandwidth to add new channels.

9. The method of claim 1, wherein the communication channel employs time reuse or frequency reuse.

10. An apparatus, comprising:
    a classifier that identifies a guard bandwidth in a bandwidth range upon which to place a communication channel on a guard band;
    a designator that places the communication channel upon the guard bandwidth of the guard band; and
    a generator that advertises a first set of guard subcarriers on a first channel monitored by a first class of devices and advertises a second set of guard subcarriers on a second channel monitored by a second class of devices, the second set of guard subcarriers being a subset of the first set of guard subcarriers wherein the second class of devices use subcarriers, included within the complement of the second set of guard subcarriers in the first set of guard subcarriers, for communications rather than as guard subcarriers.

11. The apparatus of claim 10, further comprising a tester that determines if the guard bandwidth can be used to transmit information based upon transmit power of a transmitter.

12. The apparatus of claim 10, further comprising an analyzer that uses guard subcarriers between bandwidth ranges of different carriers in a multicarrier deployment to place the communication channel.

13. The apparatus of claim 10, further comprising a selector that designates information for transmission upon the communication channel.

14. The apparatus of claim 13, further comprising an evaluator that determines information to designate for transmission upon the communication channel.

15. The apparatus of claim 14, wherein the determination of information to designate is based upon communication rate.

16. The apparatus of claim 13, further comprising a transmitter that emits the designated information along the communication channel.

17. The apparatus of claim 10, further comprising a generator that advertises a larger than necessary guard bandwidth and uses the larger than necessary guard bandwidth to add new channels.

18. The apparatus of claim 10, wherein the communication channel employs time reuse or frequency reuse.

19. An apparatus, comprising:
    means for identifying a guard bandwidth in a bandwidth range upon which to place a communication channel on a guard band;
    means for placing the communication channel upon the guard bandwidth of the guard band;
    means for advertising a first set of guard subcarriers on a first channel monitored by a first class of devices; and
    means for advertising a second set of guard subcarriers on a second channel monitored by a second class of devices, the second set of guard subcarriers being a subset of the first set of guard subcarriers wherein the second class of devices use subcarriers, included within the complement of the second set of guard subcarriers in the first set of guard subcarriers, for communications rather than as guard subcarriers.

20. The apparatus of claim 19, further comprising means for determining if the guard bandwidth can be used to transmit information based upon transmit power of a transmitter.

21. The apparatus of claim 19, further comprising means for using guard subcarriers between bandwidth ranges of different carriers in a multicarrier deployment to place the communication channel.

22. The apparatus of claim 19, further comprising means for designating information for transmission upon the communication channel.

23. The apparatus of claim 22, further comprising means for determining information to designate for transmission upon the communication channel.

24. The apparatus of claim 23, wherein the determination of information to designate is based upon communication rate.

25. The apparatus of claim 22, further comprising means for emitting the designated information along the communication channel.

26. The apparatus of claim 19, further comprising means for advertising a larger than necessary guard bandwidth and using the larger than necessary guard bandwidth to add new channels.

27. The apparatus of claim 19, wherein the communication channel employs time reuse or frequency reuse.

28. A computer program product, comprising: a non-transitory computer-readable medium comprising:
   program code for causing a computer to identify a guard bandwidth in a bandwidth range upon which to place a communication channel on a guard band;
   program code for causing the computer to place the communication channel upon the guard bandwidth of the guard band;
   program code for causing a computer to advertise a first set of guard subcarriers on a first channel monitored by a first class of devices; and
   program code for causing a computer to advertise a second set of guard subcarriers on a second channel monitored by a second class of devices, the second set of guard subcarriers being a subset of the first set of guard subcarriers wherein the second class of devices use subcarriers, included within the complement of the second set of guard subcarriers in the first set of guard subcarriers, for communications rather than as guard subcarriers.

29. The non-transitory computer-readable medium of claim 28, further comprising program code for causing a computer to determine if the guard bandwidth can be used to transmit information based upon transmit power of a transmitter.

30. The non-transitory computer-readable medium of claim 28, further comprising program code for causing a computer to use guard subcarriers between bandwidth ranges of different carriers in a multicarrier deployment to place the new communication channel.

31. The non-transitory computer-readable medium of claim 28, further comprising program code for causing a computer to designate information for transmission upon the communication channel.

32. The non-transitory computer-readable medium of claim 31, further comprising program code for causing a computer to determine information to designate for transmission upon the communication channel.

33. The non-transitory computer-readable medium of claim 32, wherein the determination of information to designate is based upon communication rate.

34. The non-transitory computer-readable medium of claim 31, further comprising program code for causing a computer to emit the designated information along the communication channel.

35. The non-transitory computer-readable medium of claim 28, further comprising program code for causing a computer to advertise a larger than necessary guard bandwidth and to use the larger than necessary guard bandwidth to add new channels.

36. The non-transitory computer-readable medium of claim 28, wherein the communication channel employs time reuse or frequency reuse.

37. At least one processor configured to communicate information in guard bandwidth, comprising:
   a first module for identifying a guard bandwidth in a bandwidth range upon which to place a communication channel;
   a second module for placing the communication channel upon the guard bandwidth;
   a third module for advertising a first set of guard subcarriers on a first channel monitored by a first class of devices; and
   a fourth module for advertising a second set of guard subcarriers on a second channel monitored by a second class of devices, the second set of guard subcarriers being a subset of the first set of guard subcarriers wherein the second class of devices use subcarriers, included within the complement of the second set of guard subcarriers in the first set of guard subcarriers, for communications rather than as guard subcarriers.

38. The processor of claim 37 further comprising a fifth module for determining if the guard bandwidth can be used to transmit information based upon transmit power of a transmitter.

39. The processor of claim 37, further comprising a fifth module for using guard subcarriers between bandwidth ranges of different carriers in a multicarrier deployment to place the communication channel.

40. The processor of claim 37, further comprising a fifth module for designating information for transmission upon the communication channel.

41. The processor of claim 40, further comprising a sixth module for determining information to designate for transmission upon the communication channel.

42. The apparatus of claim 41, wherein the determination of information to designate is based upon communication rate.

43. The processor of claim 40, further comprising a sixth module for emitting the designated information along the communication channel.

44. The processor of claim 37, further comprising a fifth module for advertising a larger than necessary guard bandwidth and using the larger than necessary guard bandwidth to add new channels.

45. The processor of claim 37, wherein the communication channel employs time reuse or frequency reuse.

* * * * *